(12) United States Patent
Perry et al.

(10) Patent No.: US 8,825,730 B1
(45) Date of Patent: Sep. 2, 2014

(54) MATRIX DECOMPOSITION USING DATAFLOW TECHNIQUES

(75) Inventors: Steven Perry, High Wycombe (GB); Coleman C. Cheung, San Diego, CA (US)

(73) Assignee: Altera Corporation, San Jose, CA (US)

( * ) Notice: Subject to any disclaimer, the term of this patent is extended or adjusted under 35 U.S.C. 154(b) by 455 days.

(21) Appl. No.: 13/252,562

(22) Filed: Oct. 4, 2011

(51) Int. Cl.
*G06F 17/16* (2006.01)

(52) U.S. Cl.
USPC .......................................................... 708/520

(58) Field of Classification Search
None
See application file for complete search history.

(56) References Cited

U.S. PATENT DOCUMENTS

| | | | |
|---|---|---|---|
| 8,396,914 B1 * | 3/2013 | Langhammer | 708/520 |
| 8,539,014 B2 * | 9/2013 | Langhammer et al. | 708/446 |
| 8,577,951 B1 * | 11/2013 | Langhammer | 708/607 |
| 2011/0238720 A1 * | 9/2011 | Langhammer et al. | 708/446 |

OTHER PUBLICATIONS

Demirsoy, S. and Langhammer M., "Fused Datapath Floating Point Implementation of Cholesky Decomposition," High Wycombe: Altera, 2009.

* cited by examiner

*Primary Examiner* — David H Malzahn

(57) ABSTRACT

Efficient and scalable circuitry for performing Cholesky decomposition is based on a dataflow style architecture which uses self-timed circuitry and eliminates the need for complicated state machines. Calculations are ordered such that partial sums of products are created in parallel subject to data dependency requirements, allowing a single accumulator to perform the summation. A Vector FIFO receives a partial sum of products from a vector processing engine. A Feedback FIFO stores partial results and feeds the partial results back to the data path based on signals from a dataflow controller. The circuitry is flexible to allow different matrix sizes, speed grades, and target frequencies without recompilation.

21 Claims, 12 Drawing Sheets

MATRIX DECOMPOSITION USING DATAFLOW TECHNIQUES

FIELD OF THE INVENTION

This invention relates to performing Cholesky decomposition in integrated circuit devices, and particularly in programmable integrated circuit devices such as programmable logic devices (PLDs).

BACKGROUND OF THE INVENTION

Certain matrix operations require that a matrix be factored. For example, factoring a matrix may be necessary when a matrix is to be inverted. The result may be a "triangulated" matrix—i.e., a matrix with zero values above the diagonal. The consequence is that only the values on the diagonal, and in the columns below those values, need to be calculated.

In Cholesky decomposition, to factor an input matrix A, an element $L_{i,i}$ of the diagonal of the resultant triangulated matrix M, may be calculated as:

$$L_{i,i} \sqrt{\left(a_{i,i} - \sum_{k=1}^{i-1} L_{i,k} \cdot L_{i,k}\right)}$$

where $a_{i,i}$ is the i,$i^{th}$ element of the original input matrix A, and $L_{i,k}$ is the i,$k^{th}$ element in the resultant triangulated matrix M. The subsequent elements in the $j^{th}$ column of M may be calculated as:

$$L_{i,j} = \frac{1}{L_{j,j}} \left(a_{i,j} - \sum_{k=1}^{j-1} L_{i,k} \cdot L_{j,k}\right), \text{ for } i > j$$

where $a_{i,j}$ is the i,$j^{th}$ element of the original input matrix A, and $L_{i,k}$ and $L_{j,k}$ are the i,$k^{th}$ and j,$k^{th}$ elements, respectively, in the resultant triangulated matrix M. To perform this calculation, the $L_{j,j}$ term needs to be calculated before any of the $L_{i,j}$ (i>j) elements can be calculated. The inner product in each term (i.e., $\Sigma_{k=1}^{j-1} L_{i,k} \cdot L_{i,k}$ or $\Sigma_{k=1}^{j-1} L_{i,k} \cdot L_{j,k}$)—which, in the case of all real values is the same as a dot product, but in the case of complex values requires computing complex conjugates—may require dozens of clock cycles. Similarly, the square root calculation in the computation of $L_{i,j}$ can also impose noticeable latency.

In standard implementations, partial computations (e.g., each product in the aforementioned inner product) are carried out in order and in adjacent cycles. A delay line is used to assemble results of the partial computations and an adder tree is used to combine the assembled results. Such implementations have various limitations. For example, these implementations limit the use of important resources such as the adder tree to a fraction of the operation time only, which increases inefficiency. Moreover, these standard implementations suffer from significant latency, especially when manipulating floating point data types. For example, typical latencies for multipliers and adders are in the range of 10 clock cycles; a dot product operator with a few tens of inputs may thus exceed a latency of 100 clock cycles. Such long latencies may cause significant routing congestion and render dataflow management intractable. Another limitation of the standard implementations is the need to know the maximum number of items to be combined at creation time, which reduces the run-time flexibility and increases the state-machine complexity of the design. Because of these limitations, standard implementations may result in systems with poor performance levels, especially with floating point operations.

Different Cholesky decomposition implementations may need to accommodate different matrix sizes or satisfy different speed grades, target frequencies, or throughput requirements. This may particularly be the case in programmable devices, where different users may require resources for matrix operations of different sizes or at different speeds.

SUMMARY OF THE INVENTION

The present invention relates to efficient and flexible circuitry for implementing Cholesky decomposition. An integrated circuit device such as a programmable logic device (PLD) may be used to implement the Cholesky decomposition circuitry.

In accordance with embodiments of the present invention, there is provided matrix operation circuitry for performing matrix decomposition operable to triangulate an input matrix to create a triangulated resultant matrix. The matrix operation circuitry includes a first register structure for storing a first partial sum of products associated with a first portion of a row of the triangulated resultant matrix and a second register structure for storing a second partial sum of products associated with a second portion of the row of the triangulated resultant matrix. The matrix operation circuitry also includes an accumulator for combining the first and second partial sums of products and a dataflow controller for selectively outputting data associated with one of an output of the accumulator or an output of the second register structure for generating an additional element of the triangulated resultant matrix. A method of configuring such circuitry on a programmable device is also provided.

In accordance with embodiments of the present invention, there is provided a controller of matrix decomposition circuitry for generating a triangulated matrix. The controller includes a column loop control circuitry for generating a column counter associated with a column of the matrix, a bank loop control circuitry for generating a bank counter associated with a portion of a row of the matrix, and a row loop control circuitry for generating a row counter associated with the row of the matrix. A start of a loop of the column loop control circuitry activates the bank loop circuitry and a start of a loop of the bank loop control circuitry activates the row loop control circuitry.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

An example 100 of a triangulated n-by-n matrix M resulting from a Cholesky decomposition is shown in FIG. 1. The elements on the diagonal are $L_{1,1}, \ldots, L_{n,n}$. In each $j^{th}$ column (e.g., column 106), the elements under $L_{j,j}$ are $L_{i,j}$, $i=j+1, \ldots, L_{n,j}$. The matrix may be considered to be empty above the diagonal, or the elements above the diagonal may be considered to be zeroes, as illustrated in example 100. The elements on the diagonal are $L_{1,1}, \ldots, L_{n,n}$ and can be obtained using the following equation:

$$L_{i,i} = \sqrt{\left(a_{i,i} - \sum_{k=1}^{i-1} L_{i,k} \cdot L_{i,k}\right)} \quad (EQ. 1)$$

where $a_{i,i}$ is the i,$i^{th}$ element of the original input matrix A, and $L_{i,k}$ is the i,$k^{th}$ element in the resultant triangulated matrix M. The subsequent elements in the $j^{th}$ column of M may be calculated as:

$$L_{i,j} = \frac{1}{L_{j,j}}\left(a_{i,j} - \sum_{k=1}^{j-1} L_{i,k} \cdot L_{j,k}\right), \text{ for } i > j \quad (EQ. 2)$$

In one sequential approach, elements of the resultant matrix may be computed sequentially in order, e.g., from the first column to the last column and from the first row to the last row. Embodiments of the present invention are based on a recognition that the computation of the $L_{i,i}$ and $L_{i,j}$ elements can be optimized using dataflow parallel processing. According to this parallel processing approach, computations are optimized to be performed in parallel stages such that data may flow from one stage to the next subject to data dependency requirements. Looking at equations 1 and 2, the length of the inner product (i.e., the number of products summed in the inner products $\Sigma_{k=1}^{j-1} L_{i,k} \cdot L_{i,k}$ or $\Sigma_{k=1}^{j-1} L_{i,k} \cdot L_{j,k}$) increases as the column index j increases. For example, computing elements of the second column of the n-by-n matrix M may only require a short inner product (of length 2), while computing elements of the last column may require an inner product of length n. Rather than sequentially computing complete rows of the resultant matrix, portions of a plurality of rows can be computed in parallel from the first to the last column. Furthermore, dependencies between partial calculations can be reduced such that multiple portions of rows are processed in each column.

Figures 1A, 1B:
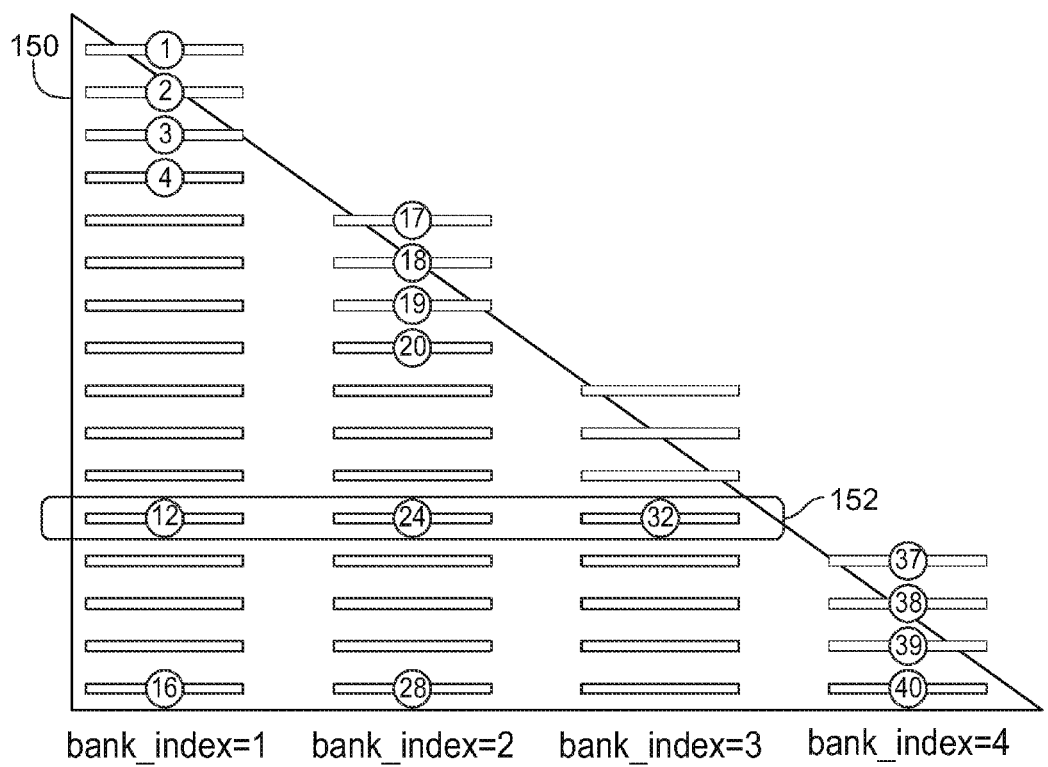
FIGS. 1A, 1B, and 1C show exemplary resultant matrices of a Cholesky decomposition operation according to embodiments of the invention.

An example of this dataflow parallel processing approach is shown in FIG. 1B, which includes an illustrative resultant matrix 150 of a Cholesky decomposition using dataflow techniques according to embodiments of the invention. Partial sums of products corresponding to portions of each row may be computed in parallel. A portion of one or more elements of a row will be referred to herein as a bank of width bank_width. In the illustrated matrix 150, portions or banks 1 through 16 may be computed in a first set of parallel computations. Similarly, banks 17 through 28 may be computed in a second set of parallel computations using results of the first set of computations. In addition to the parallel processing of partial sums of products, results of the computations can be accumulated across rows in order to compute subsequent elements. For example, partial products corresponding to three banks 12, 24, and 32 may be accumulated across row 152 to compute elements of banks 37, 38, 39, and 40.

Figure 1C:
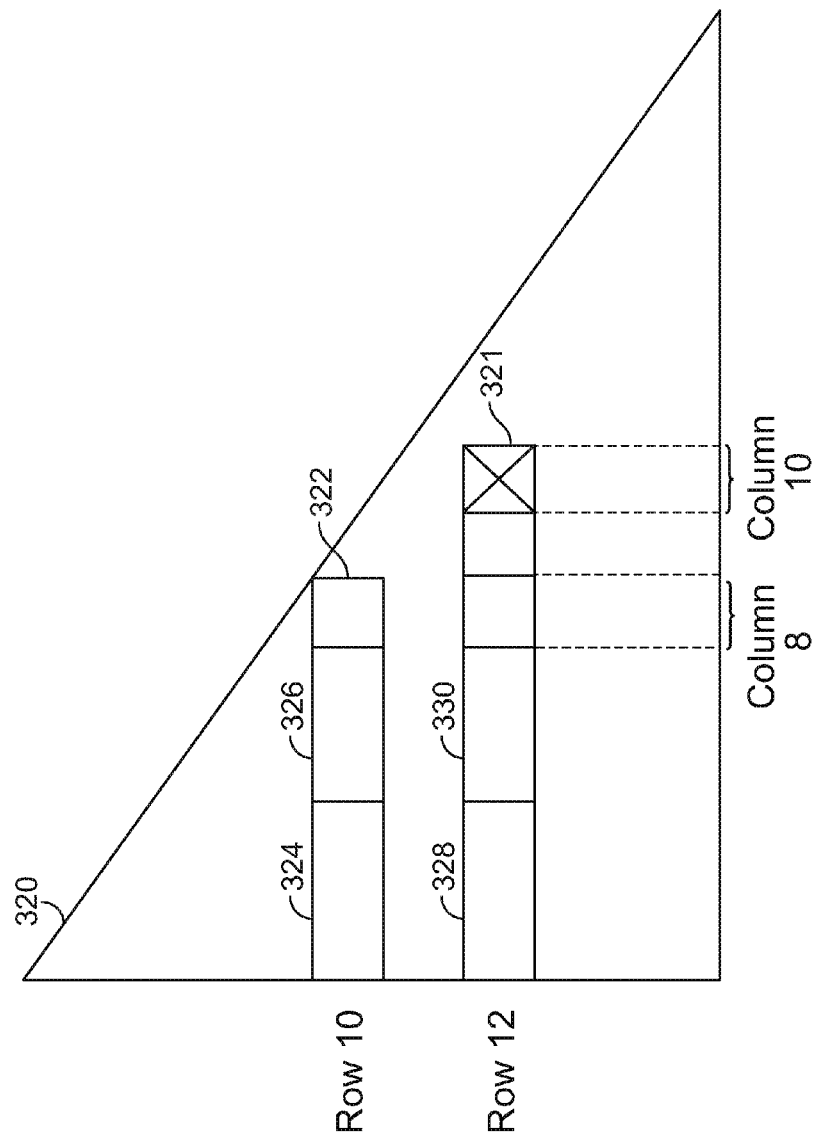

One way to combine the partial sums of products is shown in FIG. 1C. FIG. 1C shows a resultant matrix 320 using dataflow techniques according to embodiments of the invention. Matrix 320 may be similar to matrix 100 of FIG. 1A or matrix 150 of FIG. 1B. In order to compute element 321 (corresponding to $L_{12,10}$), an inspection of EQ. 2 shows that this computation involves computing inner product $\Sigma_{k=1}^{9} L_{12,k} \cdot L_{10,k}$. In other words, this computation requires an inner product of a vector of nine elements $L_{12,k}$ from row 12 by a vector of nine elements $L_{10,k}$ from row 10 (k=1, 2, ..., 9). Rather than computing this quantity as one inner product of two vectors of size 9, smaller inner products may be computed to improve efficiency. In general, the number of partial inner products to process an element in column j may be equal to (j modulo bank_width+1). In the example of FIG. 1C, a smaller inner product of size 4 (bank_width=4) may be computed that can be iterated multiple times to complete a longer inner product. For example, a first partial inner product may be computed between bank 324 and bank 328, corresponding to the first 4 elements of rows 10 and 12 (i.e., to columns 1 through 4). A second partial inner product may be computed between bank 326 and bank 330 corresponding to the next 4 elements of rows 10 and 12 (i.e., to columns 5 through 8). Finally, a third partial inner product is computed that corresponds to product $L_{12,9} \cdot L_{10,9}$ (i.e., to column 9). All 3 partial inner products may then be combined together to compute element $L_{12,10}$. This combination of three small partial inner products may increase efficiency and avoid processing a large number of zeros contained in the resultant matrix, e.g., in computations that involve shorter inner products.

Figure 2:
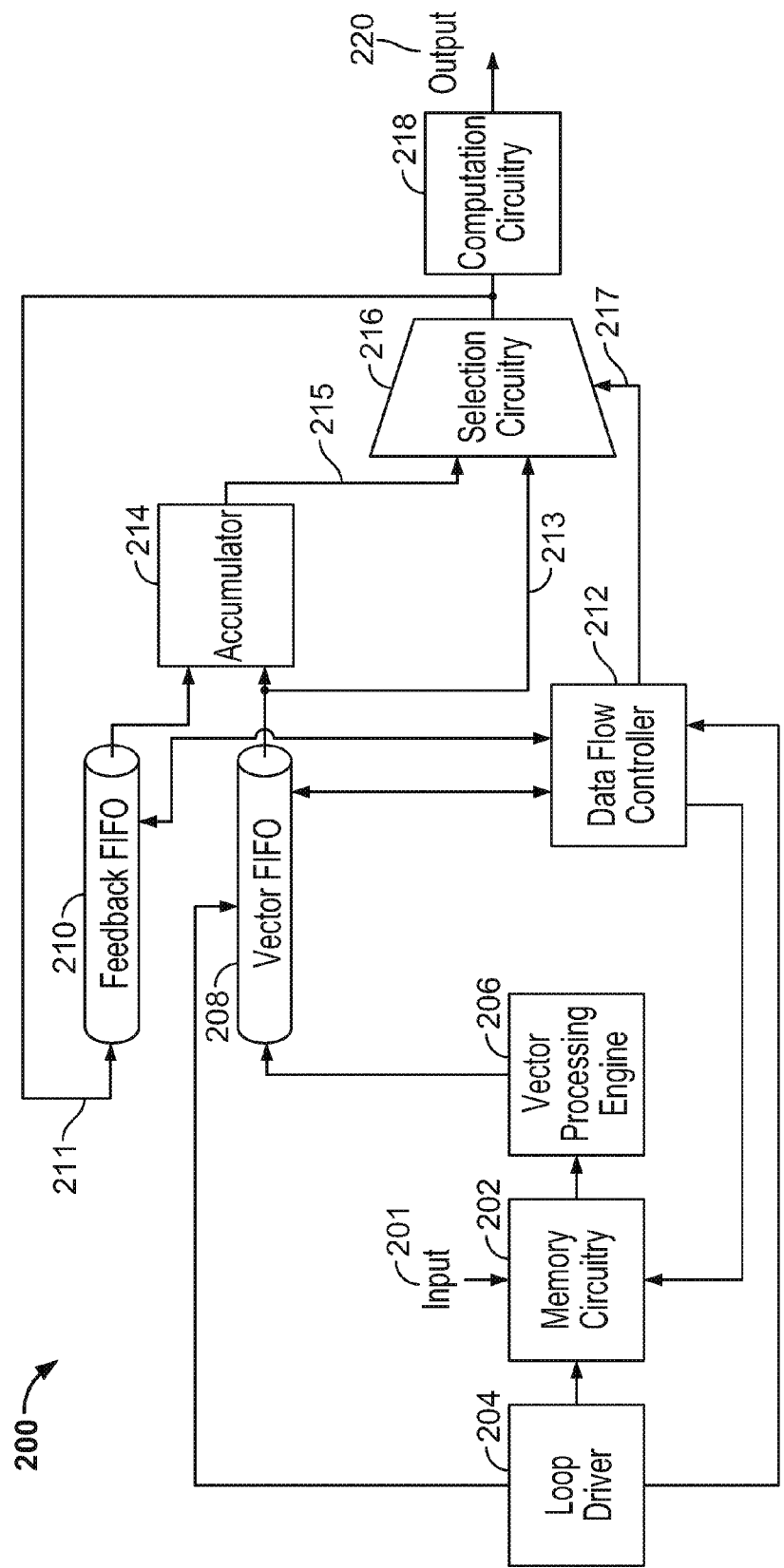
FIG. 2 shows a simplified block diagram of a system for processing a matrix according to embodiments of the invention.

FIG. 2 shows a simplified block diagram of a matrix operation system 200 for processing a matrix according to embodiments of the invention. System 200 includes memory circuitry 202, loop driver 204, and vector processing engine 206. In addition, system 200 has two data paths that include two register structures 208 and 210 controlled by dataflow controller 212. Data from the data paths are processed using accumulator 214, selection circuitry 216, and computation circuitry 218 to generate output 220. Embodiments of the components of system 200 will be described in more detail below.

Although each of register structures 208 and 210 will be referred to herein as a FIFO or a FIFO structure, this is not meant to be limiting or exhaustive. It should be appreciated that any number of FIFO queues may be used in each register structure 208 and/or 210, and that any suitable implementation may be used instead of a FIFO queue, such as, for example, a last-in first-out (LIFO) queue, a priority queue, etc. Also, it will be appreciated that each of elements 208 and 210 may be implemented as one or more stacks, as an array, as a heap, etc.

An input matrix A may initially be input into memory circuitry 202. Elements of the matrix may be sent to vector processing 206 for processing. For example, elements of a Cholesky decomposition resultant matrix M may be generated by vector processing 206. Results from the vector processing 206 may be stored in Vector FIFO 208. These results may be sent to computation circuitry 218 through selection circuitry 216 to output elements 220 of the resultant matrix M. In some computations, results from Vector FIFO 208 may be written back to Feedback FIFO 210 through link 211. These written-back results may correspond to intermediate or partial sums of products as described in FIG. 1C above. The partial results from Feedback FIFO 210 may be combined with new results from Vector FIFO 208 using accumulator 214. In some implementations, accumulator 214 may comprise adder or subtractor circuitry for combining results of the two FIFO structures. This process continues until the desired elements of the resultant matrix M are obtained.

In some embodiments, loop driver 204 may generate commands to the memory and data path elements based on a nested for loop structure that iterates over rows, columns, and banks of the matrix. For example, loop driver 204 may generate one or more counters determining which element of the resultant matrix M to process. These counters may be used to read from the memory circuitry 202, and may be decoded to generate instructions for the data path elements. For example, these counters may be communicated to the Vector FIFO 208 and the dataflow controller 212.

One advantage of matrix operation system 200 of FIG. 2 is that the particular timing for the flow of data across Vector FIFO 208 and Feedback FIFO 210 is performed in a dataflow manner, i.e., as data flows through the system. Specifically, control circuitries of system 200, such as loop driver 204 and dataflow controller 212, need not count cycles and/or delay pulses, as would be the case in state-machine controlled implementations. This greatly improves flexibility. For example, because the particular operator latencies of the hardware components of system 200 need not be encoded in the design, the system can be retargeted to different speeds and/or clock frequencies at runtime. For instance, the design may be retargetable to different FPGA families without recompilation.

In some embodiments, accumulator 214 combines outputs of Feedback FIFO 210 and Vector FIFO 208 at each clock cycle. However, the output 215 of the accumulator 214 may only be sent to computation circuitry 218 when the output 215 is valid. This may be accomplished using selection circuitry 216, which may provide output 215 to computation circuitry 218 when it is determined that the output is valid. This determination may be done by dataflow controller circuitry 212.

In some embodiments, dataflow controller circuitry 212 is latency insensitive, i.e., the dataflow controller may adapt to the speed of the components of matrix operation system 200. For example, dataflow controller 212 may not be concerned with the particular latencies of underlying hardware of system 200, such as vector processing 206 or write/read speeds of memory circuitry 202. Instead, the dataflow controller may determine when accumulator 214 has a meaningful, i.e., valid output. For example, when an element $L_{i,1}$ of a first column of input matrix A is being processed, dataflow controller 212 may control the selection circuitry 216, through control input 217, to generate output 213 of Vector FIFO 208 to computation circuitry 218, because such an element would not need to be combined with other partial products. In cases where results from Vector FIFO 208 are valid and ready to be combined with other valid results from the Feedback FIFO 210, the dataflow controller 212 may instruct the selection circuitry 216 to select output 215. Additionally, loop driver 204 and dataflow controller 212 may determine when data output by vector processing 206 is valid, and in response to that determination, may issue a read pulse to the Vector FIFO and Feedback FIFO to consume the valid data.

One advantage of using FIFO structures 208 and 210 to store data is that the dataflow is maintained by the valid data itself, i.e., the structures can be viewed as self-timed. For example, each of FIFO structures 208 and 210 may assert a validity signal output as long as the FIFO structure contains valid data. By using this validity signal to control the dataflow, different latencies and/or speeds can be automatically accommodated. This may be advantageous in various situations. For example, if the manipulated data type is changed from fixed to double precision, the latency of accumulator 214 may be increased. However, this different latency can be accommodated automatically at runtime due to the use of FIFO structures 208 and 210. In this way, a small and fast design can be achieved for blocks with long-latency calculations, such as ones involving floating-point libraries.

Another advantage of the matrix operation architecture described above is providing a robust design that is also scalable and flexible and can dynamically accept different matrix sizes at runtime, i.e., without recompilation. As the problem (matrix size) gets bigger, the same hardware can be reused to aggregate more partial results as they appear, using a running total. Only one accumulator may thus be needed. The following figures will describe embodiments of various components of matrix operation system 200 in detail. These embodiments are not meant to be limiting, and it should be understood that various modifications can be made by those skilled in the art without departing from the scope and spirit of this disclosure.

Figure 3A:
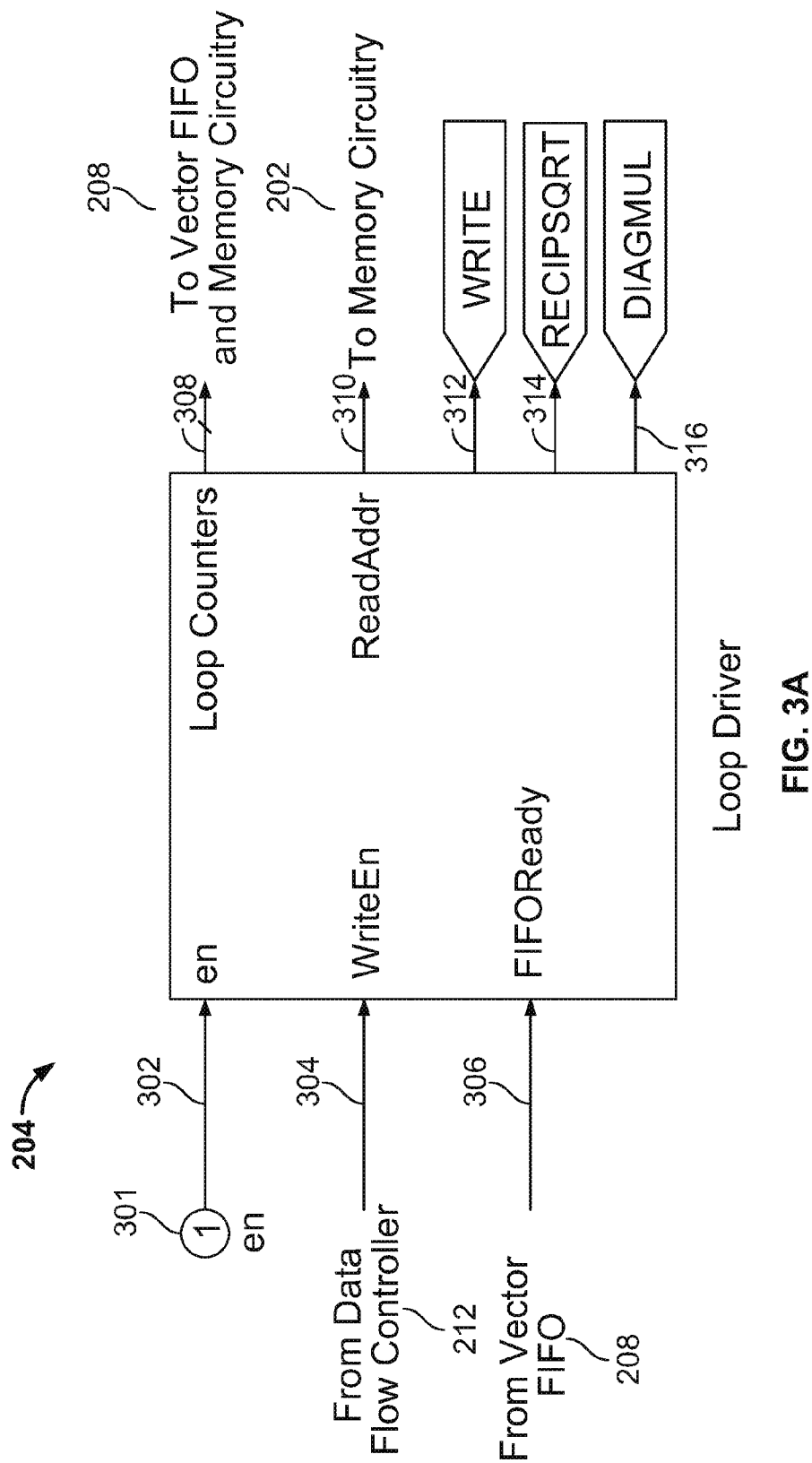
FIG. 3A illustrates an exemplary loop driver of a matrix operation system according to some embodiments.

FIG. 3A illustrates an exemplary loop driver 204 according to some embodiments. Loop driver 204 includes three enable inputs: an enable 'en' input 302 that activates the loop driver 204, and may be coupled to an enable pin 301; a write enable input 304 that may be coupled to dataflow controller 212; and a FIFO 'Ready' input 306 that may be coupled to Vector FIFO 208. In addition, loop driver 204 may provide loop counter outputs 308 to memory circuitry 202 and Vector FIFO 208. These loop counters may correspond to indices of a corresponding column, row, and bank for a particular element of matrix M. Loop driver 204 may also generate a read address 'ReadAddr' output 310 that may be used by memory circuitry 202.

In addition, loop driver 204 may generate specific commands to be used by the data path elements, e.g., by the FIFO structures 208 and 210 as well as dataflow controller 212. In one embodiment, these commands can correspond to bits that may be independently set to a '0' or a '1'. In some embodiments, loop driver 204 may generate a WRITE command 312, which includes an instruction to write computed values back to memory circuitry 202. Loop driver 204 may generate a RECIPSQRT command 314, which includes an instruction to perform a reciprocal square root operation. Loop driver 204 may also generate a DIAGMUL command 316, which includes an instruction to perform a diagonal operation. These commands may be derived from the loop counters generated by the loop driver, for example, when the loop counters indicate that a diagonal element is being processed. These commands may be passed through the various data path elements, e.g., Vector FIFO 208 and Feedback FIFO 210, to ensure data consistency of the data stored in the FIFO structures with the memory circuitry 202 and the vector processing engine 206. In addition, these commands may be used by the dataflow controller 212 to determine how to process the data output from the FIFO structures 208 and 210.

Loop counter outputs 308 of loop driver 204 may be used to control various elements of matrix operation system 200 by, for example, scheduling various read and write operations in memory circuitry 202 and processing operations in vector processing 206 and computation circuitry 218. In some embodiments, the decomposition of matrix A is achieved one element at a time, from a first column (j=1) to a last column (j=n). Within each $j^{th}$ column of the resultant triangulated matrix M, the diagonal element $L_{j,j}$ may be computed first. Subsequent elements $L_{i,j}$ (i>j) within the $j^{th}$ column may be solved independently because these elements do not have inter-dependencies among them.

Figure 3B:
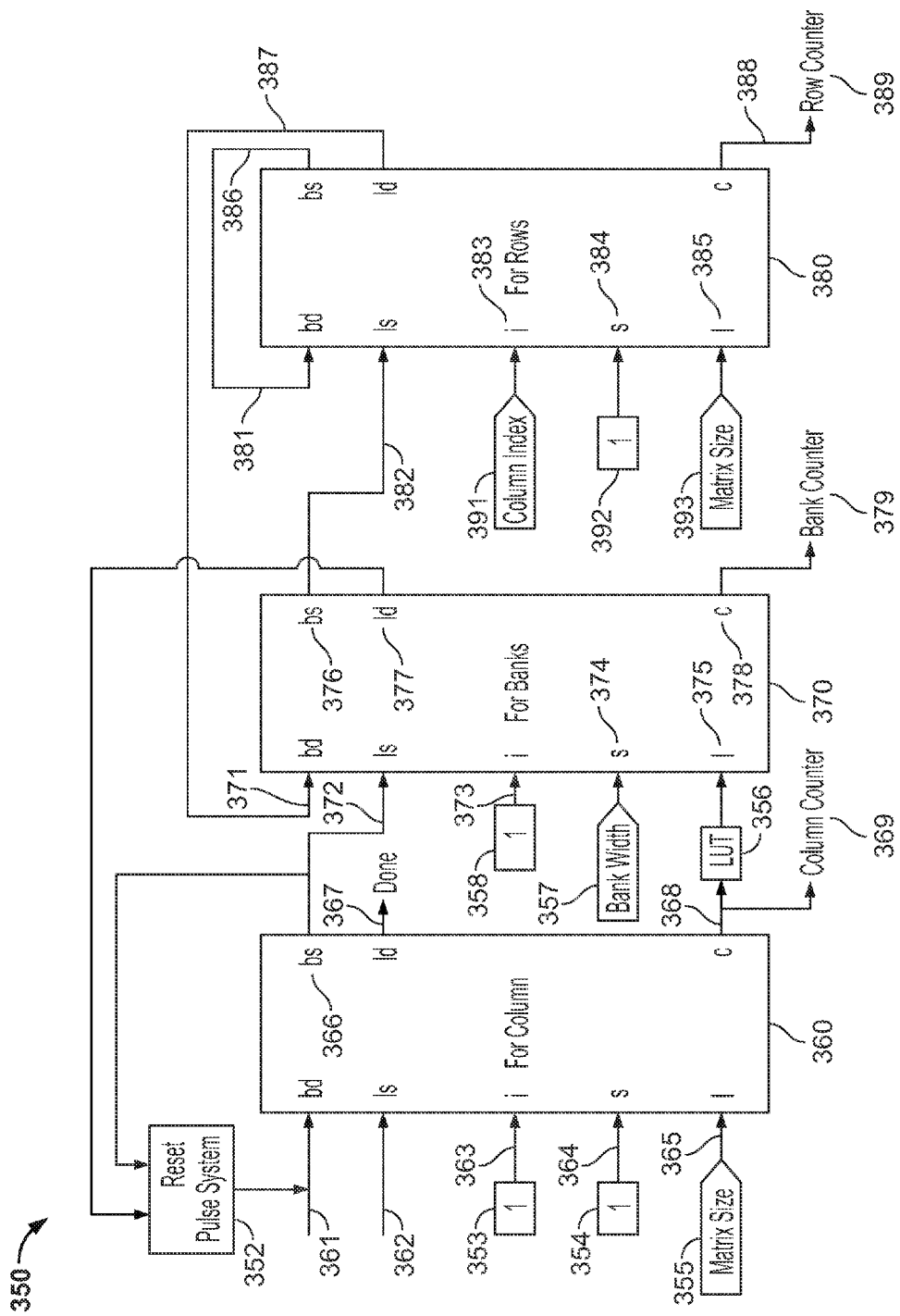
FIG. 3B shows exemplary control circuitry for generating loop counters, according to some embodiments.

FIG. 3B shows exemplary control circuitry 350 for generating loop counters, according to some embodiments. Control circuitry 350 can be a component of loop driver 204 for generating loop counter outputs 308. Control circuitry 350 includes three cascaded for loop control circuitries 360, 370, and 380. Each loop control circuitry implements a loop that executes multiple iterations of the body of the loop (i.e., the process that is being repeatedly executed) using a loop counter 'c'. For the purpose of initializing the loop, each loop control circuitry has loop initialization parameters including loop counter start 'i', step 's', and limit 'l'. These parameters may be latched to parameters of the input matrix size and/or memory width. For example, loop control circuitry 360 generates a counter 368 for iterating over the columns of the matrix M. The counter 368 may range from counter start i=1 to limit l=n in increments of 1. This is accomplished by latching the start 'i' input 363 of loop control circuitry 360 to a '1' constant 353, latching the limit 'l' input 365 of loop control circuitry 360 to the matrix size 355, and latching the step 's' input 364 to a '1' constant 354.

In addition to the initialization parameters described above, and in order to control the iterative processing of the matrix decomposition, each for loop control circuitry in FIG. 3B has a loop start 'ls' input, a body done 'bd' input, a body start 'bs' output, and a loop done 'ld' output. These inputs and outputs operate as follows. To start a loop, a token (for example, a single cycle pulse) representing an active state may be passed from loop start 'ls' to body start 'bs'. In response to this activation of 'bs', counter 'c' is initialized to the start value 'i'. When one iteration is done (i.e., the body computation is done), the token is passed back to body done 'bd' and the counter 'c' is checked against the limit 'l'. If the counter 'c' has not reached the limit 'l', the counter 'c' is incremented or decremented as specified by step 's' and the token is passed to body start 'bs' again. This is repeated until counter 'c' reaches the limit 'l'. When counter 'c' reaches 'l', the for loop control circuitry is exit by passing the token through loop done 'ld'.

In order to implement nested loops, loop control circuitries 360, 370, and 380 are cascaded such that (1) the body start 'bs' of an outer loop is connected to the loop start 'ls' of the inner loop and (2) the loop done 'ld' of the inner loop is connected to the body done 'bd' of the outer loop. In this way, when an activation token is passed to the body start of the outer loop control circuitry, this token is passed to the loop start input of the inner loop control circuitry. Once the inner loop control circuitry is done, the token is passed back to the outer loop circuitry. In addition, the 'bs' output 386 of the innermost loop control circuitry 380 is connected to the 'bd' input 381 of the same loop control circuitry. This means that the counter 'c' of the innermost loop control circuitry 380 need not wait for other loops to be executed, and the activation token is just directly passed from the body start output to the body done input of the loop control circuitry 380. By cascading the three loop control circuitries in this way, column counter 369, bank counter 379, and row counter 389 are generated such that they iterate through a resultant matrix M in a vertical zigzag fashion as described in FIGS. 1B and 1C above—i.e., from column 1 to column n, and within each column j, from a bank 1 to bank (j modulo bank_width+1), and within each bank, from row j to row n.

In some embodiments, the 'ld' output 377 of loop control circuitry 370 may be directly coupled to the 'bd' input 361 of loop control circuitry 360. In other embodiments, the 'ld' output 377 of loop control circuitry 370 may be coupled to the 'bd' input 361 of loop control circuitry 360 through a pulse system 352. Pulse system 352 may take as input the 'bs' output 366 of loop control circuitry 360. When a new outermost column loop is started (i.e., the processing of a first column of a new matrix is started), the 'bs' output of loop control circuitry 360 may activate a reset of the pulse system 352. Pulse system 352 may also use other signals such as signals output from memory circuitry 204 or dataflow controller 212 to ensure that a new column loop is not started until data for the previous column loop has been appropriately processed.

Loop control circuitry 360 generates column counter 369 which may range from 1 to matrix size. Counter control loop 380 generates row column 389 which may range from 1 to matrix size. The limits of the ranges are exemplary and it should be understood that any appropriate limit can be used. For example, memory organization of memory circuitry 202 may be modified such that different range values may be appropriate.

Loop control circuitry 370 generates a bank counter 379. This bank counter or index may be used to determine a number of partial inner products to compute. For example, going back to matrix 320 of FIG. 1C, computing elements in columns 1 to 4 (corresponding to bank index=1) may require one partial inner product and may engage a dot product engine (e.g., vector processing 206) once. Computing elements in columns 5 to 8 (corresponding to bank index=2) may require two partial inner products. Computing elements in columns 9 to 12 (corresponding to bank index=3) may require three partial inner products. Finally, computing elements in column 13 to 16 (corresponding to bank index=4) may require four partial inner products. The corresponding bank indices or counters, which determine the number of partial inner products to combine, may be generated with loop control circuitry 370.

As explained in FIG. 1C above, the bank index for an element in column j of a resultant matrix may be computed as j modulo bank_width+1. It follows that the limit 'l' of loop control circuitry 370 may be determined based on column counter 368. For example, the limit of the bank counter may be determined as column counter 368 modulo bank_width+1. This mapping from the column counter 369 to the limit 'l' 375 of the bank loop control circuitry 370 may be accomplished using look-up table 356.

It should be understood that the order in which the counter control circuitries in FIG. 3B are cascaded is exemplary and is not meant to be limiting. For example, although the bank loop control circuitry 370 is at the outer loop of the row loop control circuitry 380 in the example of FIG. 3B, the row loop control circuitry 380 may be at the outer loop of the bank loop control circuitry 370. In some embodiments, it may be suitable to implement the bank loop control circuitry 370 at the outer loop of the row loop control circuitry 380 because of floating point accumulator issues. For example, because floating point operations may require multiple clock cycles, combining all banks of the same row with a single accumulator may require a long time. Putting the bank loop control circuitry outside the row loop control circuitry may improve utilization and hide latency by channelizing the accumulator across a smaller number of banks (compared to putting the row loop control circuitry outside the bank loop control circuitry).

Figure 4:
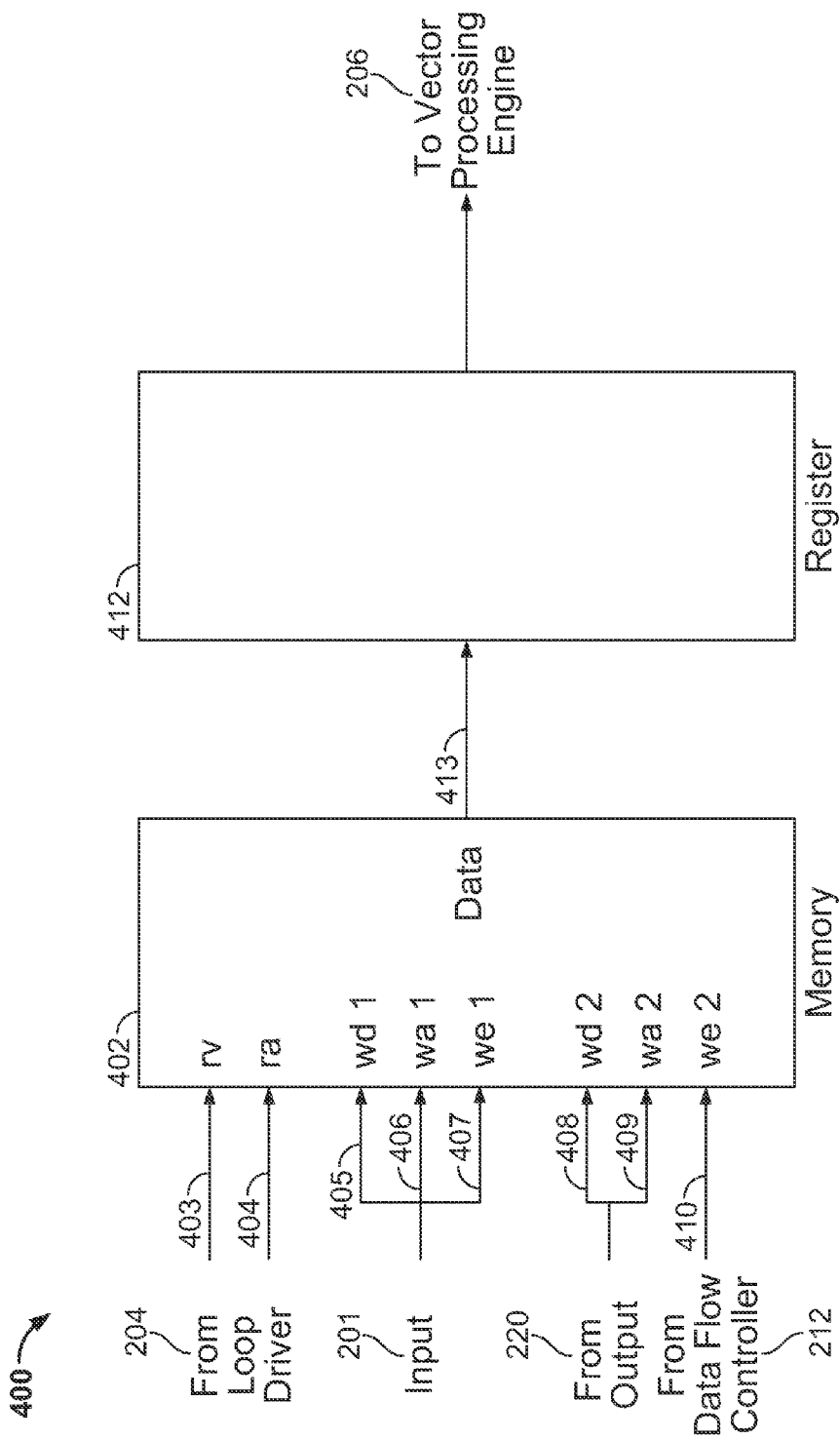
FIG. 4 shows an exemplary memory circuitry of a matrix operation system, according to some embodiments.

FIG. 4 shows an exemplary memory circuitry 204, according to some embodiments. Memory circuitry 204 includes memory 402 and, optionally, register circuitry 412. In some embodiments, memory 402 may be dual ported, that is, it may have two separate write ports. Initially, input matrix A may be input into memory 402 using a first write input port connected to input 201. For example, the first write input port may include write data 'wd1' input 405, write address 'wa1' input 406, and write enable 'we1' input 407. As the $L_{i,j}$ elements of the resultant matrix M are computed, the corresponding elements $a_{i,j}$ of the input matrix may no longer be needed. Therefore, input matrix A and resultant matrix M may share the same dual ported memory 402. A second write input port may be used to write the $L_{i,j}$ elements back into the memory 402. The second write input port includes write data 'wd2' input 408 and write address 'wa2' input 409, both coupled to output 220, as well as write enable 'we2' input 410 coupled to dataflow controller 212. The second write input port may have a higher priority than the first write input port to ensure performance, e.g., to ensure that a resultant matrix $M_1$ for a first input matrix $A_1$ has been appropriately processed before a new input matrix $A_2$ is input through the first write input port. In some embodiments, the writing back through the second write input port may follow the same order as the computation controlled by the row loop control circuitry 380 of FIG. 3B. In this case, an entire column of elements (from the diagonal element to the last element in the column) may be written back to the memory in one burst.

The reading of data by memory 402 may be controlled by the loop driver 204. For example, memory 402 may include a reading validity 'rv' input 403 and reading address 'ra' input 404, which may be received from the loop driver 204. When the reading validity 'rv' input is asserted, memory 402 may read data at address 'ra'. This data may be sent for processing to vector processing 206 through register 412. Register 412 may be used to latch the appropriate data from memory circuitry 202, which may increase efficiency.

Figure 5:
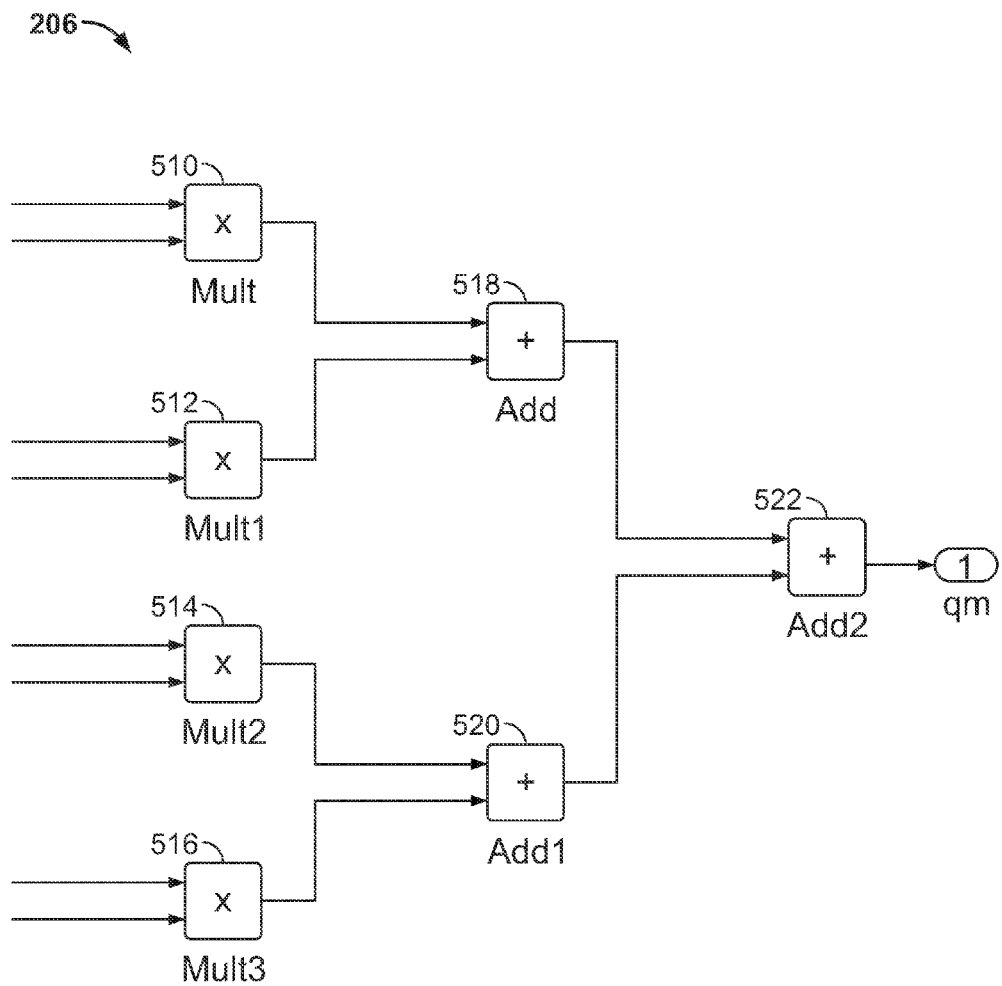
FIG. 5 shows an exemplary vector processing engine for computing partial inner products, according to some embodiments.

FIG. 5 shows an exemplary vector processing engine 206 for computing partial inner products, according to some embodiments. Vector processing 206 may include multiplier circuitries 510, 512, 514, and 516, and adder circuitries 518, 520, and 522. In some embodiments, multiplier circuitries may be conjugate multipliers and are able to process complex elements. Multiplier circuitries 510, 512, 514, and 516 receive as inputs diagonal elements $L_{j,j}$ (i.e., EQ. 1) or a non-diagonal element $L_{i,j}$ (i.e., EQ. 2) of resultant matrix M. Adder circuitry 518 combines the respective products from multiplier circuitries 510 and 512 to generate a first partial inner product (i.e., corresponding to a portion or all of the inner product $\tau_{k=1}^{j-1} L_{i,k} \cdot L_{i,k}$ of EQ. 1 or $\Sigma_{k=1}^{j-1} L_{i,k} \cdot L_{j,k}$ of EQ. 2). Similarly, adder circuitry 520 combines the respective products from multiplier circuitries 514 and 516 to generate a second partial inner product. Adder circuitry 522 combines outputs of adder circuitries 518 and 520 to generate an inner product that corresponds to the sum of 4 elements.

The illustrated implementation of vector processing 206 can increase the speed of the computation. For example, data may be supplied to the vector processing engine through parallel memory blocks so that each memory block supplies data directly to the operands of each multiplier circuitry. Therefore, an inner product or a partial inner product can be calculated at each clock cycle. Vector processing 206 may thus provide an inner product of two vectors of size 4 at each clock cycle. This may be implemented, for example, to compute the first, second, and third partial inner products described in FIG. 1C above. Although vector processing 206 shows 4 multipliers, this is meant to be illustrative and is not limiting or exhaustive. Any number of multipliers may be used as appropriate.

Figure 6:
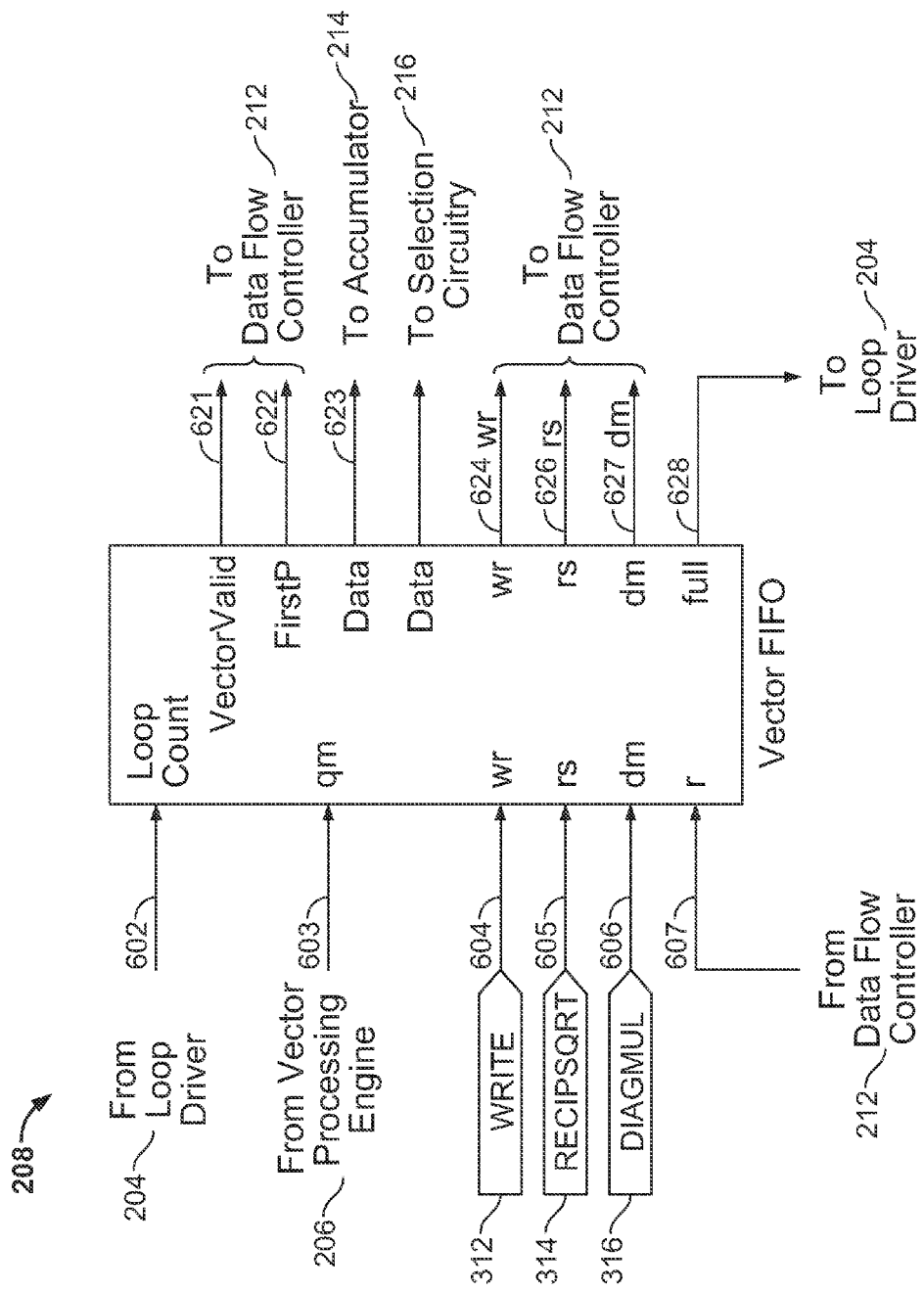
FIG. 6 shows an exemplary Vector FIFO structure of a matrix operation system, according to some embodiments.

FIG. 6 shows an exemplary Vector FIFO structure 208, according to some embodiments. Vector FIFO structure 208 includes a loop counter input 602, a partial inner product input 603, and one or more command inputs. In the illustrated example, these command inputs include write 'wr' command input 604, reciprocal square root 'rs' command input 605, and diagonal multiplication 'dm' command input 606. As explained above in connection with FIG. 3A, these command inputs may be configured using bits set by loop driver 204 (e.g., as described in connection with commands 312, 314, and 316 of FIG. 3A). These commands flow through Vector FIFO 208 and are output through outputs 625, 626, and 627 to dataflow controller 212. In addition, Vector FIFO 208 receives a read 'r' input from dataflow controller 212, instructing the Vector FIFO 208 to read data. Based on the control inputs received from the loop driver 204 and the dataflow controller 212, Vector FIFO 208 reads data from the vector processing engine 206 through data input 603. If the data in the FIFO structure 208 is determined to be valid, a validity 'vectorValid' output 621 is sent to dataflow controller 212. If the data in the FIFO structure 208 is determined to correspond to a first element along a row of resultant matrix M, a 'firstP' validity output 622 may be sent to the dataflow controller 212. As will be described in further detail below, this validity signal 'firstP' may be used by the dataflow controller 212 to determine that the data in the Vector FIFO is ready to be output without having to be combined with other partial results from Feedback FIFO 210. In addition, based on the control inputs received from the loop driver 204 and the dataflow controller 212, the FIFO structure 208 may determine to output stored data to accumulator 214 through data output 623 or to output stored data to selection circuitry 216 through data output 216.

Another feature of Vector FIFO 208 is the ability of output, through 'full' output 628, an indication that the Vector FIFO 208 is full. When the data path is slow, and the Vector FIFO fills up, this 'full' signal may be fed back to the loop driver 204, thus stopping the various loop counters from increasing. This back pressure may stall the hardware to avoid losing data. This back pressure may also provide a mechanism for ensuring that the components of the matrix processing system (e.g., system 200 of FIG. 2) adjust to various latencies of the underlying hardware components.

Figure 7:
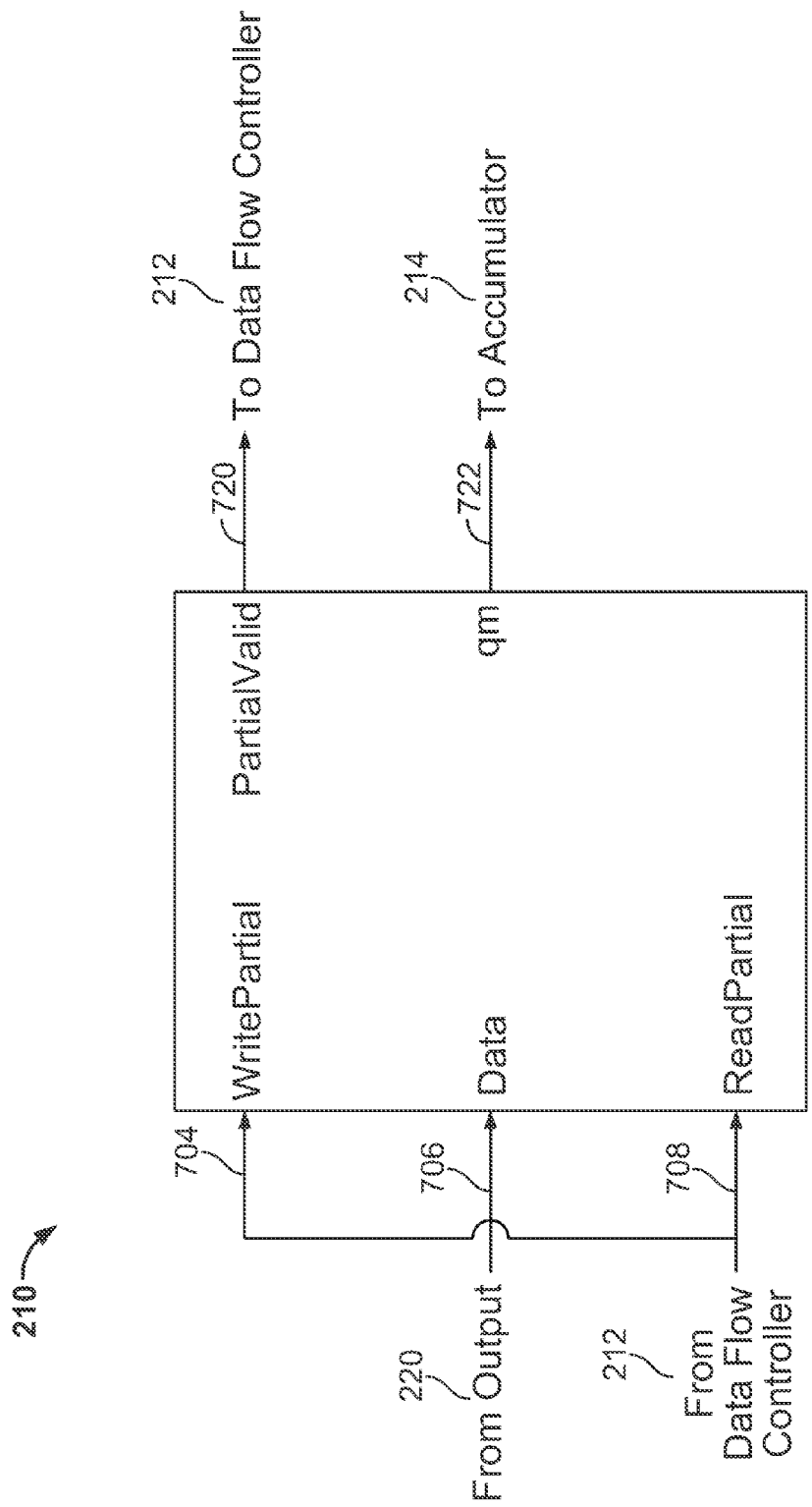
FIG. 7 shows an exemplary Feedback FIFO of a matrix operation system, according to some embodiments.

FIG. 7 shows an exemplary Feedback FIFO 210 according to some embodiments. Feedback FIFO 210 may receive previously computed partial inner products through input 706. For example, input 706 may be coupled to output 220, directly or through delay elements, to allow for various latencies of the matrix operation system. In addition, Feedback FIFO 210 may have a write 'writePartial' input 704 and a read 'readPartial' input 708 received from dataflow controller 212. The 'readPartial' input 708 may receive a 'readPartial' signal to read from the particular component of Feedback FIFO 210 that contains the partial results accumulated so far. For example, Feedback FIFO 210 may include more than one FIFO queues, and the 'readPartial' signal may activate the particular FIFO queue that contains the partial results accumulated so far. Dataflow controller 212 may set 'readPartial' signal to true when a start of a row is not being processed and there are previously calculated results waiting in the feedback FIFO. The 'writePartial' input is the write control of Feedback FIFO 210 and may receive a 'writePartial' signal. Dataflow controller 212 may set 'writePartial' signal to true when an end of a row is not being processed and a value is to be sent to Feedback FIFO 210 for later accumulation. For input matrices with small dimensions (e.g., where one inner product is required for an entire row), neither 'writePartial' nor 'readPartial' signals may be set to true, since no previous values would need to be read and no partial results would need to be written for later accumulation. Alternatively, for input matrices with larger dimensions (e.g., where more than one inner product is required for an entire row), dataflow controller 212 may set the 'writePartial' and 'readPartial' signals as discussed. If there is no partial result in Feedback FIFO 210, then dataflow controller 212 can determine that a calculation is in process in some other part of the data path, and therefore Feedback FIFO 210 may be held up by dataflow controller 212 until the computation is done and the result of the computation is written to the Feedback FIFO.

Feedback FIFO structure 210 outputs a validity 'partialValid' signal 720 when the FIFO structure contains valid partial data. The data stored in Feedback FIFO 210 may be output through output 722 to accumulator 214.

Figure 8A:
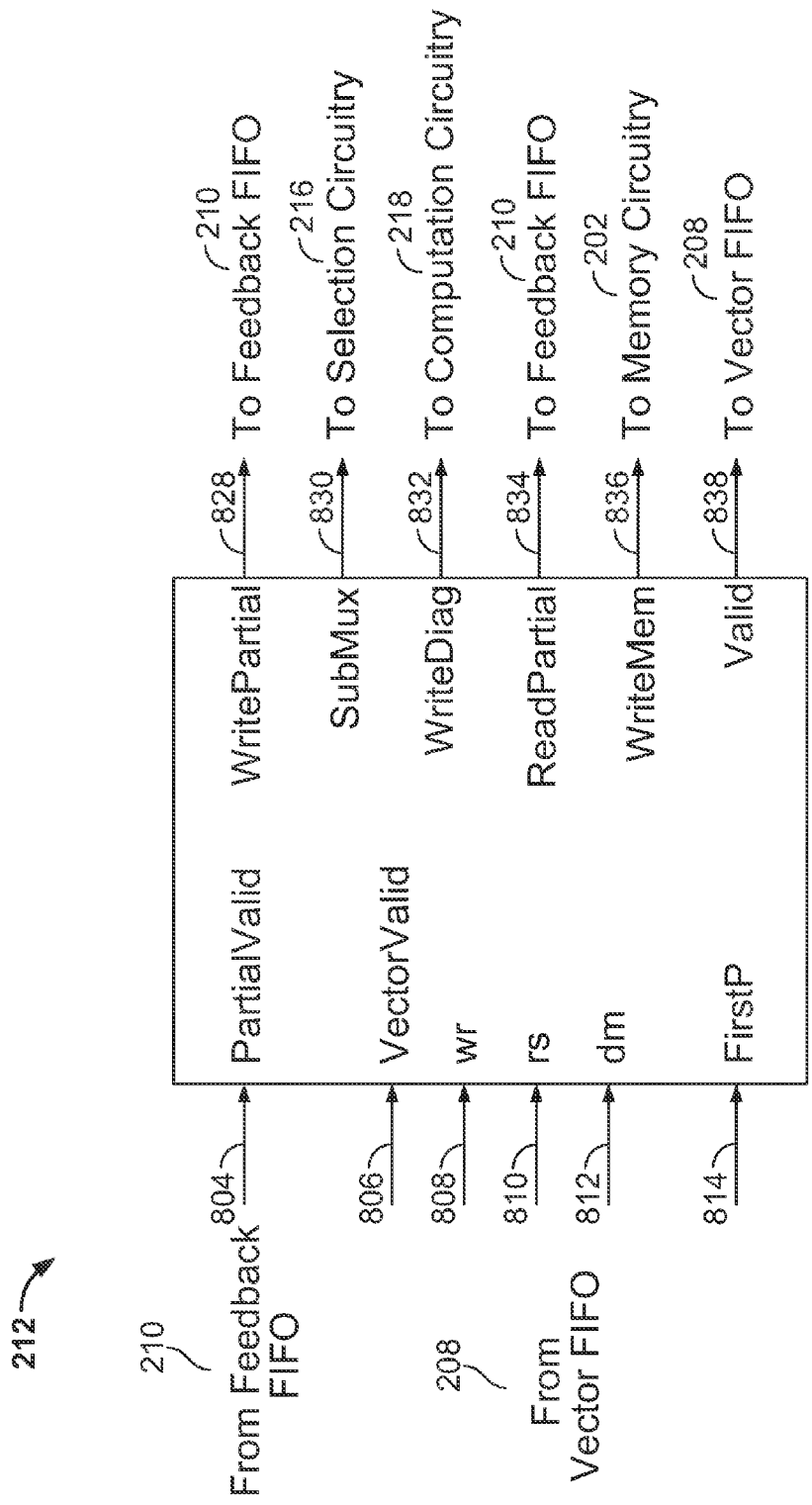
FIG. 8A shows an exemplary dataflow controller of a matrix operation system, according to some embodiments.

FIG. 8A shows an exemplary dataflow controller 212, according to some embodiments. Dataflow controller 212 receives a first validity 'partialValid' signal 804 from Feedback FIFO 210. This signal indicates whether Feedback FIFO 210 contains valid partial data. In addition, dataflow controller 212 receives a second validity 'vectorValid' signal from Vector FIFO 208. This signal indicates whether Vector FIFO 208 contains valid partial data. In addition to the 'vectorValid' and 'partialValid' signals, dataflow controller 212 may receive inputs corresponding to control commands as discussed above. These may correspond to write 'wr' input 808, reciprocal square root 'rs' input 810, and diagonal multiplication 'dm' input 812, as explained in FIG. 6 above. Dataflow controller 212 may also receive a 'firstP' input 814, indicating whether Vector FIFO 208 contains a first element of a row of resultant matrix M.

Dataflow controller 212 processes the inputs received from the FIFO structures 208 and 210 to produce outputs 828, 830, 832, 834, 836, and 838 to control various other components of matrix processing system 200 of FIG. 2. Specifically, outputs 'writePartial' 828 and 'readPartial' 834 are sent to Feedback FIFO 210 to control writing and reading data into Feedback FIFO 210, as described in FIG. 7 above. Validity signal 838 is sent to the read 'r' input 607 of Vector FIFO 208 to activate the Vector FIFO as explained in FIG. 6 above. Selection control 'SubMux' signal 830 is sent to the control input 217 of selection circuitry 216 as explained in FIG. 2 above. Memory write enable 'writeMem' signal 836 is sent to memory circuitry 202 to enable the writing back process (i.e., as explained in connection with write enable input 'we2' of memory 402 of FIG. 4). Finally, diagonal write enable 'writeDiag' signal 832 may be sent to control computation circuitry 218, as will be described in FIG. 9 below.

Figure 8B:
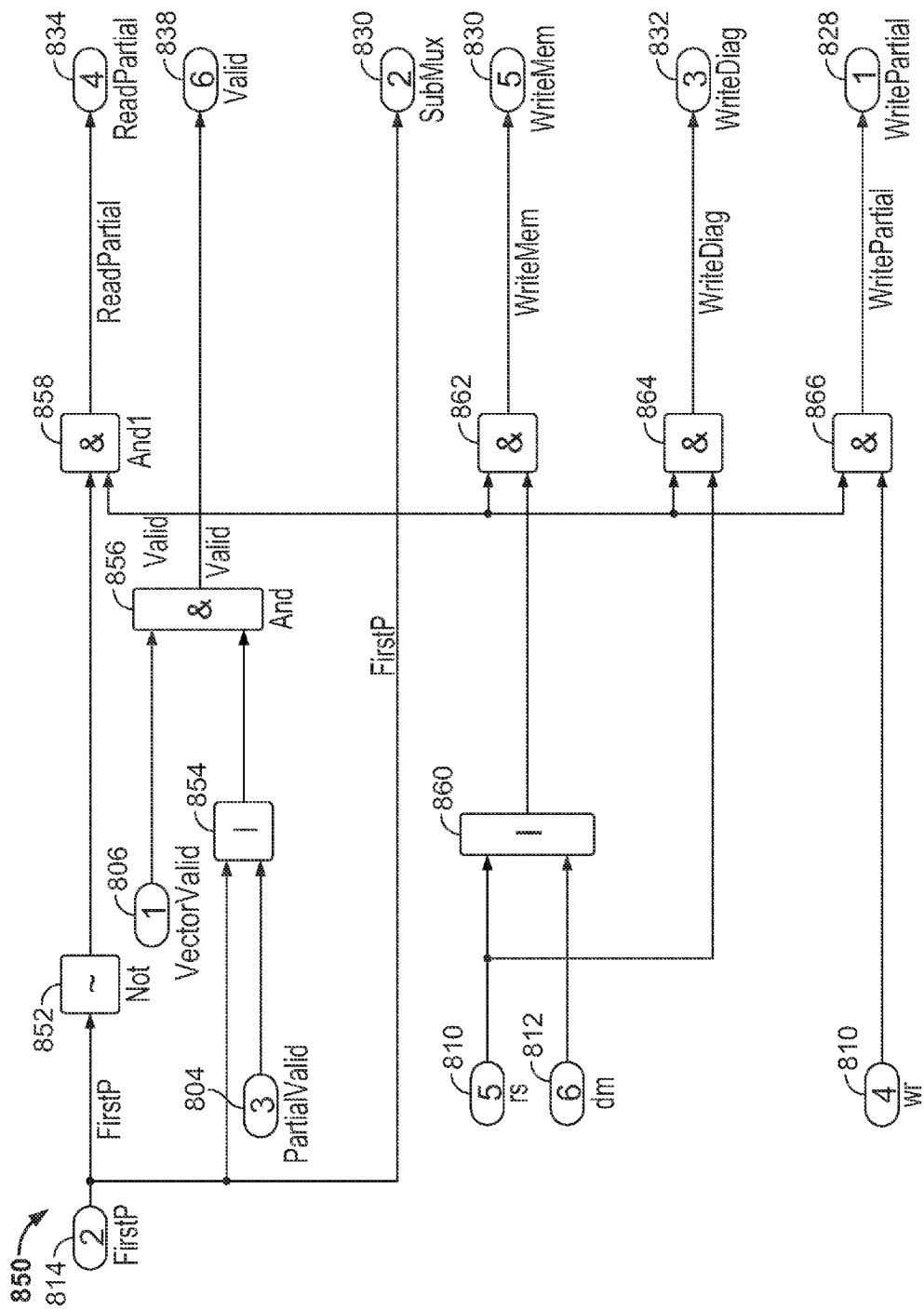
FIG. 8B shows an exemplary logic of the dataflow controller of FIG. 8A, according to some embodiments.

The control output signals shown in FIG. 8A may be generated using exemplary logic circuitry 850 illustrated in FIG. 8B. Logic 850 includes NOT gate 852, AND gates 856, 858, 862, 864, and 866, and OR gates 854 and 860. Using OR gate 854 and AND gate 856, validity signal 838 is asserted in two cases. First, validity signal 838 is asserted if both validity signals 'vectorValid' 806 and 'partialValid' 804 are asserted (i.e., when both Feedback FIFO and Vector FIFO contain valid data). Alternatively, validity signal 838 is asserted if 'vectorValid' 806 is asserted and 'firstP' 814 is asserted (i.e., when Vector FIFO 208 contains valid data and there is no need for partial results from the Feedback FIFO 210 because a first element in a row of the resultant matrix M is being processed).

The validity signal 838 may be further used in computing the other outputs of dataflow controller 212. For example, using AND gate 858 and NOT gate 852, 'readPartial' signal 834 is asserted if the validity signal 838 is asserted and 'firstP' 814 is not asserted. This means that Feedback FIFO 210 may be controlled to read more data when data in FIFO 208 (and possibly in Feedback FIFO 210) is valid and the element being processed is not the first element in a row. Write command 'wr' 808 is combined with the validity signal 838 using AND gate 866 to generate 'writePartial' output 832. Similarly, reciprocal square root 'rs' command 810 is combined with the validity signal 838 using AND gate 864 to generate 'writeDiag' output 832. Memory write enable 'WriteMem' 830 is asserted when, in addition to the valid signal being asserted, either 'rs' or 'dm' are asserted, indicating that new components may be output and may need to be written to memory circuitry 204.

Furthermore, logic 850 generates selection control 'SubMux' signal 830 based on 'firstP' 814. In this way, when 'firstP' 814 is asserted, selection circuitry 216 of FIG. 2 is controlled to provide the output of Vector FIFO 210 to the computation circuitry 218. Alternatively, when 'firstP' is de-asserted, selection circuitry 216 is controlled to output data from accumulator 214 to the computation circuitry 218.

Figure 9:
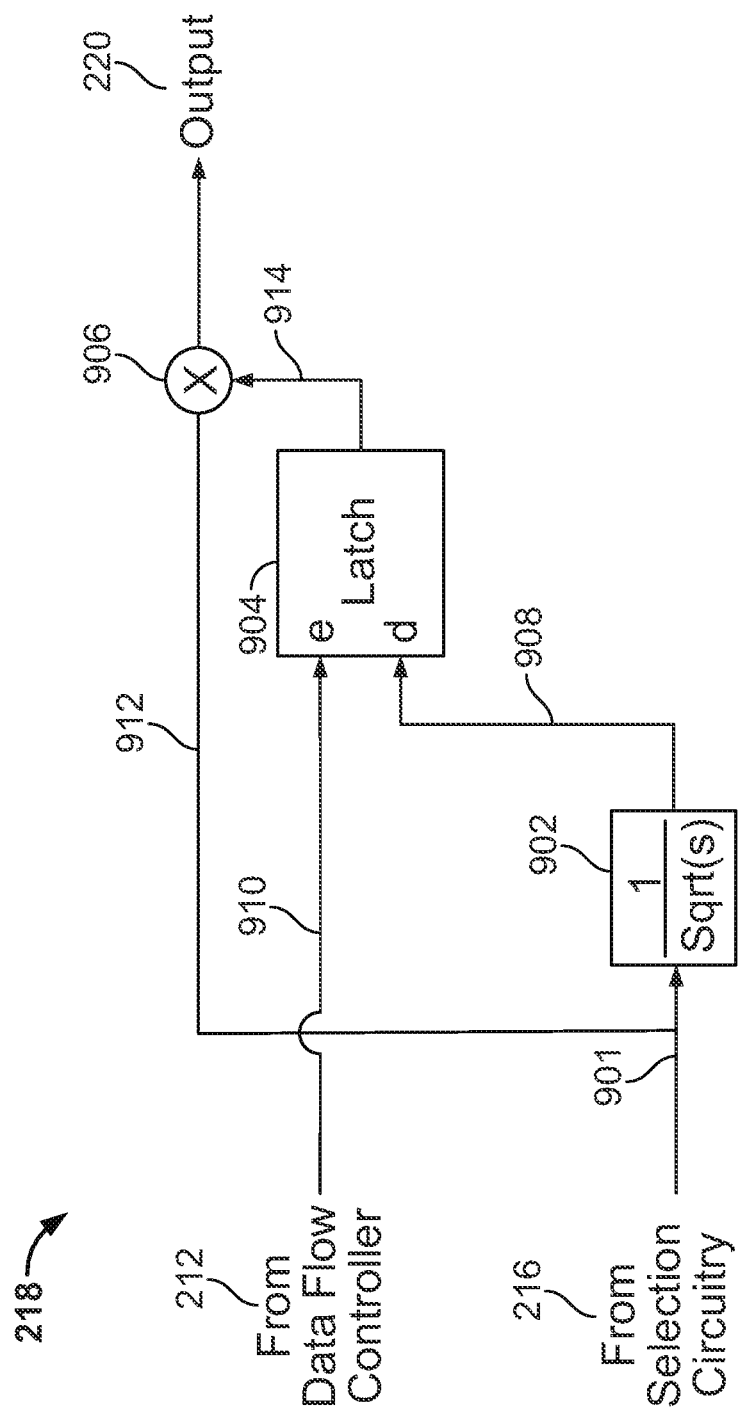
FIG. 9 shows an exemplary computation circuitry 218, according to some embodiments.

FIG. 9 shows an exemplary computation circuitry 218, according to some embodiments. Computation circuitry 218 includes an inverse square root module 902, latch circuitry 904, and multiplier circuitry 906. Inverse square root module 902 computes the inverse square root of input 901 to generate an inverse square root output 908. The input 901 may be received from selection circuitry 216 of operation matrix 200 of FIG. 2. If the enable input 910 of the latch circuitry 904 is activated, the inverse square root output 908 may be stored into the latch circuitry. Otherwise, if the enable input is not activated, the data previously stored in latch circuitry 904 is output to multiplier circuitry 906. In some embodiments, the enable input 910 may be provided from control circuitry, e.g., based on write enable 'writeDiag' signal 832 from the dataflow controller 212 of FIG. 8A. This enable input may be determined based on a diagonal multiplication command (e.g., the DIAGMUL command 316 of FIG. 3A). Multiplier circuitry 906 multiplies the output of the latch circuitry 904 by input 912 to provide product element 220. The same computation circuitry may be used to compute a diagonal element $L_{j,j}$ (i.e., EQ. 1) or a non-diagonal element $L_{i,j}$ (i.e., EQ. 2) as described below.

As can be seen from EQ. 1, computing $L_{j,j}$ elements may involve generating a square root of the inner product difference element $a_{i,i} - L_{i,k} \cdot L_{i,k}$. Because it may be easier and cheaper to implement inverse square root functions than square root functions, this computation may be accomplished by multiplying an inverse square root of the difference element with the difference element itself rather than computing the square root directly. To do this, the difference element is provided to input 901 of inverse square module 908 and to input 912 of multiplier circuitry 906. Because this is a diagonal element computation, enable input 910 of latch circuitry 904 is activated. In response to this activation, the inverse square root 908 of the difference element, generated from inverse square root module 902, is latched into latch circuitry 904. This inverse square root 908 is then input to multiplier circuitry 906 through input 914. Multiplier circuitry 906 thus multiplies the difference element received through input 912 with the inverse square root output 908 of the difference element to generate diagonal element $L_{j,j}$.

As can be seen from EQ. 2, computing non-diagonal elements $L_{i,j}$ (i>j) may involve multiplying inner product difference element $a_{i,j}-L_{i,k}\cdot L_{j,k}$ by the inverse of $L_{i,j}$. Similarly to the diagonal element computation, the difference element $a_{i,j}-L_{i,k}\cdot L_{j,k}$ may be input from selection circuitry 216. However, and unlike the diagonal element computation, the enable input 910 of latch 904 is not activated in this case, and as a result, the inverse of $L_{j,j}$ is still latched into latch circuitry 904. As a result, multiplication module 906 still receives the inverse of $L_{j,j}$ from latch circuitry 904 through input 914. Multiplication module 906 thus multiplies the difference element $a_{i,j}-L_{i,k}\cdot L_{j,k}$ received through input 912 with the inverse of $L_{j,j}$ received through input 914 to generate non-diagonal element $L_{i,j}$. The same inverse square root used to compute $L_{j,j}$ is thus reused for computing the subsequent elements in the column ($L_{i,j}$) using multiplication, which is easier and cheaper to implement than division.

Although described above in the context of Cholesky decomposition, the systems and methods described herein may be implemented in other embodiments for a variety of matrix operations. For example, the systems and methods described herein may be used for solving linear matrices in an integrated circuit device, or any class of matrix operations involving multiplication of a series of vectors by a single initial vector. Therefore, in some of those embodiments, some of the structures included with the embodiments described above, such as accumulator 216, or components of computation circuitry 218, may not be included, or may be modified but those embodiments would still be within the present disclosure.

The structures described above also may be generated in fixed logic, in which case the sizes of the various computational components may be fixed to a particular application. Alternatively, the fixed logic circuitry could allow for limited parameterization.

One potential use for the systems and methods discussed above may be in programmable integrated circuit devices such as programmable logic devices, where programming software can be provided to allow users to configure a programmable device to perform matrix operations. The result would be that fewer logic resources of the programmable device would be consumed than otherwise. And where the programmable device is provided with a certain number of dedicated blocks for arithmetic functions (to spare the user from having to configure arithmetic functions from general-purpose logic), the number of dedicated blocks needed to be provided (which may be provided at the expense of additional general-purpose logic) can be reduced (or sufficient dedicated blocks for more operations, without further reducing the amount of general-purpose logic, can be provided).

Instructions for carrying out a method according to embodiments of the present invention for programming a programmable device to perform sample rate conversion may be encoded on a machine-readable medium, to be executed by a suitable computer or similar device to implement the method of embodiments of the present invention for programming or configuring programmable logic devices (PLDs) or other programmable devices. For example, a personal computer may be equipped with an interface to which a PLD can be connected, and the personal computer can be used by a user to program the PLD using a suitable software tool, such as the QUARTUS® II software available from Altera Corporation, of San Jose, Calif.

It will be understood that the foregoing is only illustrative of the principles of the invention, and that various modifications can be made by those skilled in the art without departing from the scope and spirit of the disclosure. For example, the various elements of this disclosure can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Matrix operation circuitry for decomposing an input matrix to generate a triangulated resultant matrix, the circuitry comprising:
   a first register structure for storing a first partial sum of products associated with a first portion of a row of the triangulated resultant matrix;
   a second register structure for storing a second partial sum of products associated with a second portion of the row of the triangulated resultant matrix;
   an accumulator for combining the first and second partial sums of products; and
   a dataflow controller for selectively outputting data associated with one of an output of the accumulator or an output of the second register structure for generating an additional element of the triangulated resultant matrix.

2. The matrix operation circuitry of claim 1, wherein the dataflow controller is operable to receive a first validity signal from the first register structure and a second validity signal from the second register structure, and wherein the dataflow controller is operable to selectively output the data associated with one of the output of the accumulator or the output of the second register structure based on the first and second validity signals.

3. The matrix operation circuitry of claim 1 further comprising a vector processing engine for outputting the first partial sum of products associated with the first portion of the row and second partial sum of products associated with the second portion of the row, wherein the vector processing engine is coupled to an input of the second register structure.

4. The matrix operation circuitry of claim 1 further comprising selection circuitry having a first data input coupled to the output of the accumulator, a second data input coupled to the output of the second register structure, and a control input coupled to an output of the dataflow controller.

5. The matrix operation circuitry of claim 4 further comprising computation circuitry operable to compute a square root of an output of the selection circuitry.

6. The matrix operation circuitry of claim 5, wherein the computation circuitry comprises inverse square root circuitry operable to compute an inverse square root of the output of the selection circuitry, and multiplier circuitry operable to multiply said inverse square root by the output of the selection circuitry.

7. The matrix operation circuitry of claim 5 further comprising memory circuitry for storing the input matrix, wherein content of the memory circuitry is updated based on the output of the computation circuitry.

8. The matrix operation circuitry of claim 1 further comprising a loop driver for generating control inputs for the second register structure and the dataflow controller, wherein the matrix operation circuitry is configured to dynamically adjust the control inputs based on a size of the input matrix.

9. The matrix operation circuitry of claim 8, wherein:
   the first portion of the row includes one or more banks, each bank comprising a sequence of a predetermined number of elements of the row;

the second portion of the row includes one bank comprising another sequence of the predetermine number of elements of the row; and the control inputs from the loop driver comprise a column counter, a bank counter, and a row counter, wherein the column, bank, and row counters are used to schedule iterations for generating corresponding elements of the triangulated resultant matrix.

10. The matrix operation circuitry of claim 9, wherein matrix decomposition is performed from a first column to an $n^{th}$ column of the input matrix, and wherein, within each such column of the input matrix, a diagonal element is computed first, and elements below the diagonal element are processed in parallel based on the generated column, bank, and row counters.

11. The matrix operation circuitry of claim 1, wherein each of the first and second register structures comprise at least one first-in first-out (FIFO) queue.

12. A method of configuring a programmable integrated circuit device for triangulating an input matrix to create a triangulated resultant matrix, said method comprising:

configuring logic of said programmable integrated circuit device as a first register structure for storing a first partial sum of products associated with a first portion of a row of the triangulated resultant matrix;

configuring logic of said programmable integrated circuit device as a second register structure for storing a second partial sum of products associated with a second portion of the row of the triangulated resultant matrix;

configuring logic of said programmable integrated circuit device as an accumulator for combining the first and second partial sums of products; and configuring logic of said programmable integrated circuit device as a dataflow controller for selectively outputting data associated with one of an output of the accumulator or an output of the second register structure in order to generate an additional element of the triangulated resultant matrix.

13. The method of claim 12 further comprising configuring logic of said programmable integrated circuit device as a vector processing engine for outputting the first partial sum of products associated with the first portion of the row and second partial sum of products associated with the second portion of the row, wherein the vector processing engine is coupled to an input of the second register structure.

14. The method of claim 12 further comprising configuring logic of said programmable integrated circuit device as selection circuitry having a first data input coupled to the output of the accumulator, a second data input coupled to the output of the second register structure, and a control input coupled to an output of the dataflow controller.

15. The method of claim 14 further comprising configuring logic of said programmable integrated circuit device as computation circuitry operable to compute a square root of an output of the selection circuitry.

16. The method of claim 15 further comprising configuring logic of said programmable integrated circuit device as memory circuitry for storing the input matrix, wherein content of the memory circuitry is updated based on the output of the computation circuitry.

17. A controller of matrix decomposition circuitry for generating a triangulated matrix, the controller comprising:

a column loop control circuitry for generating a column counter associated with a column of the matrix;

a bank loop control circuitry for generating a bank counter associated with a portion of a row of the matrix; and a row loop control circuitry for generating a row counter associated with the row of the matrix, wherein a start of a loop of the column loop control circuitry activates the bank loop circuitry and a start of a loop of the bank loop control circuitry activates the row loop control circuitry.

18. The controller of claim 17, further comprising a pulse system for initiating the start of the loop of the column loop control circuitry.

19. The processing element of claim 18, further comprising:

a processing engine for computing elements of the matrix; and logic circuitry for decoding the column, row, and bank indices to derive a corresponding command signal for the processing engine.

20. The controller of claim 19, wherein the corresponding command signal is one of a write command signal for writing an output of the processing engine to memory circuitry, a reciprocal square root command signal for performing a reciprocal square root operation, and a diagonal multiplication command signal for performing a diagonal multiplication operation.

21. The controller of claim 17 further comprising a look-up table for mapping a limit of the column counter to a limit of the bank counter.

* * * * *